United States Patent
Sato et al.

(10) Patent No.: US 7,621,602 B2
(45) Date of Patent: Nov. 24, 2009

(54) VEHICLE BRAKE CONTROL DEVICE

(75) Inventors: Takashi Sato, Okazaki (JP); Hiroaki Niino, Toyota (JP)

(73) Assignee: Advics Co., Ltd., Aichi-pref. (JP)

( * ) Notice: Subject to any disclaimer, the term of this patent is extended or adjusted under 35 U.S.C. 154(b) by 473 days.

(21) Appl. No.: 11/702,502

(22) Filed: Feb. 6, 2007

(65) Prior Publication Data
US 2007/0188015 A1    Aug. 16, 2007

(30) Foreign Application Priority Data
Feb. 15, 2006   (JP)   ............... 2006-037993

(51) Int. Cl.
*B60T 13/18* (2006.01)
*B60T 8/42* (2006.01)

(52) U.S. Cl. ............... 303/11; 303/156; 303/115.5; 303/116.1; 303/20

(58) Field of Classification Search ........... 303/10, 303/11, 113.1, 115.1, 115.2, 115.4, 115.5, 303/116.1, 116.2, 20, 155, 156
See application file for complete search history.

(56) References Cited

U.S. PATENT DOCUMENTS

| | | | | |
|---|---|---|---|---|
| 5,487,593 A | * | 1/1996 | Potts et al. ............... | 303/11 |
| 5,558,414 A | * | 9/1996 | Kubota ............... | 303/10 |
| 6,113,197 A | * | 9/2000 | Kuroki et al. ............... | 303/11 |
| 6,234,588 B1 | | 5/2001 | Sawada | |
| 6,291,960 B1 | * | 9/2001 | Crombez ............... | 318/599 |
| 6,402,260 B1 | * | 6/2002 | Kobayashi et al. ............... | 303/20 |
| 6,595,598 B2 | * | 7/2003 | Harris et al. ............... | 303/11 |
| 7,165,818 B2 | * | 1/2007 | Iwasaki et al. ............... | 303/115.5 |
| 7,469,974 B2 | * | 12/2008 | Maki et al. ............... | 303/11 |
| 2007/0205658 A1 | * | 9/2007 | Sato et al. ............... | 303/10 |
| 2007/0210642 A1 | * | 9/2007 | Niino et al. ............... | 303/11 |

FOREIGN PATENT DOCUMENTS

| | | |
|---|---|---|
| JP | A-10-203338 | 8/1998 |
| JP | A-11-301435 | 11/1999 |

\* cited by examiner

*Primary Examiner*—Thomas J Williams
(74) *Attorney, Agent, or Firm*—Posz Law Group, PLC

(57) ABSTRACT

A vehicle brake control device determines a first duty factor required to achieve a stable rotational speed of motors and a second duty factor required to achieve a change rate of a target wheel cylinder pressure. The vehicle brake control device selects the larger one of the determined duty factors as a for-use motor duty factor to be used in outputting currents to the motors. Therefore, with the stable rotational speed and the change rate of the target wheel cylinder pressure, it is possible to achieve quick response to a request for braking made by a driver while suppressing the electric energy consumption of the motors.

5 Claims, 11 Drawing Sheets

|  | NORMAL BRAKING | UBNORMAL BRAKING |
|---|---|---|
| SNO1 | ON (CLOSED) | OFF (OPEN) |
| SNO2 | ON (CLOSED) | OFF (OPEN) |
| SWC1 | ON (OPEN) | OFF (CLOSED) |
| SWC2 | ON (OPEN) | OFF (CLOSED) |
| SLFR | DUTY | OFF (OPEN) |
| SLRL | DUTY | OFF (OPEN) |
| SLFL | DUTY | OFF (OPEN) |
| SLRR | DUTY | OFF (OPEN) |
| SCSS | ON (OPEN) | OFF (CLOSED) |
| FIRST & SECOND MOTOR | VARIABLE CONTROL | OFF |

FIG.8

VEHICLE BRAKE CONTROL DEVICE

CROSS REFERENCE TO RELATED APPLICATION

This application is based on and incorporates herein by reference Japanese patent application No. 2006-37993 filed on Feb. 15, 2006.

FIELD OF THE INVENTION

The present invention relates to a vehicle brake control device which generates a pressure (hereinafter referred to as a W/C pressure) in a wheel cylinder (hereinafter referred to as a W/C) by causing a pump to apply a pressure.

BACKGROUND OF THE INVENTION

In Japanese Patent Publication No. H10-203338, a brake-by-wire vehicle brake control device is proposed which has four pumps respectively for the four wheels of a vehicle. Two of the four pumps are located in a common conduit path for two of the four wheels and are driven by a common motor. The other two of the four pumps are located in another common conduit path for the other two of the four wheels and are driven by another common motor.

The brake-by-wire vehicle brake control device drives the two motors which dominantly consume electric energy supplied from a battery. It is therefore desirable to suppress electric energy consumption of the two motors. In this aspect, it should be avoided to keep the motors always in full operation (that is, to keep the motors always in a state where they can be rotated at such a rotational speed that the pumps discharge the brake fluid at the maximum efficiency), even if keeping the motors in full operation contributes to quick response of the vehicle brake control device at the beginning of braking.

In another aspect, in order to change the W/C pressure in quick response to a driver's request for braking, it is desirable to keep the motors always in the state where they can be rotated at such a rotational speed that the pumps discharge the brake fluid at the maximum efficiency.

A method is hence necessary for achieving quick response to a request for braking made by the driver while suppressing the electric energy consumption of the motors.

SUMMARY OF THE INVENTION

It is therefore an object of the present invention to provide a brake-by-wire vehicle brake control device which achieves quick response to a request for braking made by the driver while suppressing the electric energy consumption of the motors.

A control means of the vehicle brake control device of the present invention includes a first calculation portion, a second calculation portion, a third calculation portion, and an adjustment portion. The first calculation portion is for calculating the target wheel cylinder pressure according to a detected operation amount of a brake operating member, on detecting, by means of an operation amount sensor, that the brake operating member is operated. The second calculation portion is for calculating a change rate of the target wheel cylinder pressure.

The third calculation portion is for: calculating, based on the calculated target wheel cylinder pressure, a first duty factor of currents for supplying to a first motor and a second motor, the first duty factor being required in order to achieve a first rotational speed the first and second motors at which first to fourth liner valves stably adjust pressures to a first front wheel cylinder, a second front wheel cylinder, a first rear wheel cylinder, and a second rear wheel cylinder; calculating a second duty factor of currents for supplying to the first motor and the second motor, wherein the second duty factor is a duty factor required to achieve the calculated change rate of the target wheel cylinder pressure; and selecting the larger one of the first duty factor and the second duty factor as a for-use duty factor to be used in outputting the currents to the first motor and the second motor. The adjustment portion is for adjusting, based on the selected for-use duty factor, the current value for supplying the first motor and the second motor.

The vehicle brake control device of the present invention therefore determines the first duty factor required to achieve the first rotational speed and the second duty factor required to achieve the change rate of the target wheel cylinder pressure. The vehicle brake control device selects the larger one of the determined duty factors as the for-use motor duty factor to be used in outputting the currents to the motors. Therefore, with the first rotational speed and the change rate of the target wheel cylinder pressure, it is possible to achieve quick response to a request for braking made by the driver while suppressing the electric energy consumption of the motors.

For example, in the vehicle brake control device, the third calculation portion may calculate a torque of the first and second motors corresponding to the calculated target wheel cylinder pressure and may determine the first duty factor corresponding to the calculated torque and the first rotational speed, based on a characteristic relation among a duty factor, a torque of a given motor, and a rotational speed of the given motor.

In the vehicle brake control device, the first calculation portion may calculate the target wheel cylinder pressure at every calculation time instant coming at a calculation interval. The third calculation portion may: calculate a pump output rate being a value obtained by dividing the difference between a first brake fluid amount and a second brake fluid amount by the calculation interval, the first brake fluid amount being required in order to generate a first value of the target wheel cylinder pressure calculated at the latest calculation time instant, the second brake fluid amount being required in order to generate a second value of the target wheel cylinder pressure calculated at the second latest calculation time instant; may calculate, based on an amount of the brake fluid outputted per a 360-degree rotation by the first to fourth pumps, a second rotational speed of the first and the second motors required to achieve the change rate of the target wheel cylinder pressure; may calculate a torque of the first and second motors corresponding to the calculated first value of the target wheel cylinder pressure; and may determine the second duty factor corresponding to the calculated torque and the second rotational speed, based on a characteristic relation among a duty factor, a torque of a given motor, and a rotational speed of the given motor.

BRIEF DESCRIPTION OF THE DRAWINGS

The invention, together with additional objective, features and advantages thereof, will be best understood from the following description, the appended claims and the accompanying drawings in which:

FIG. 8 is a schematic diagram showing operating states of portions in the vehicle brake control device in normal braking and in an abnormal situation;

DETAILED DESCRIPTION OF THE EMBODIMENTS

Figure 1:
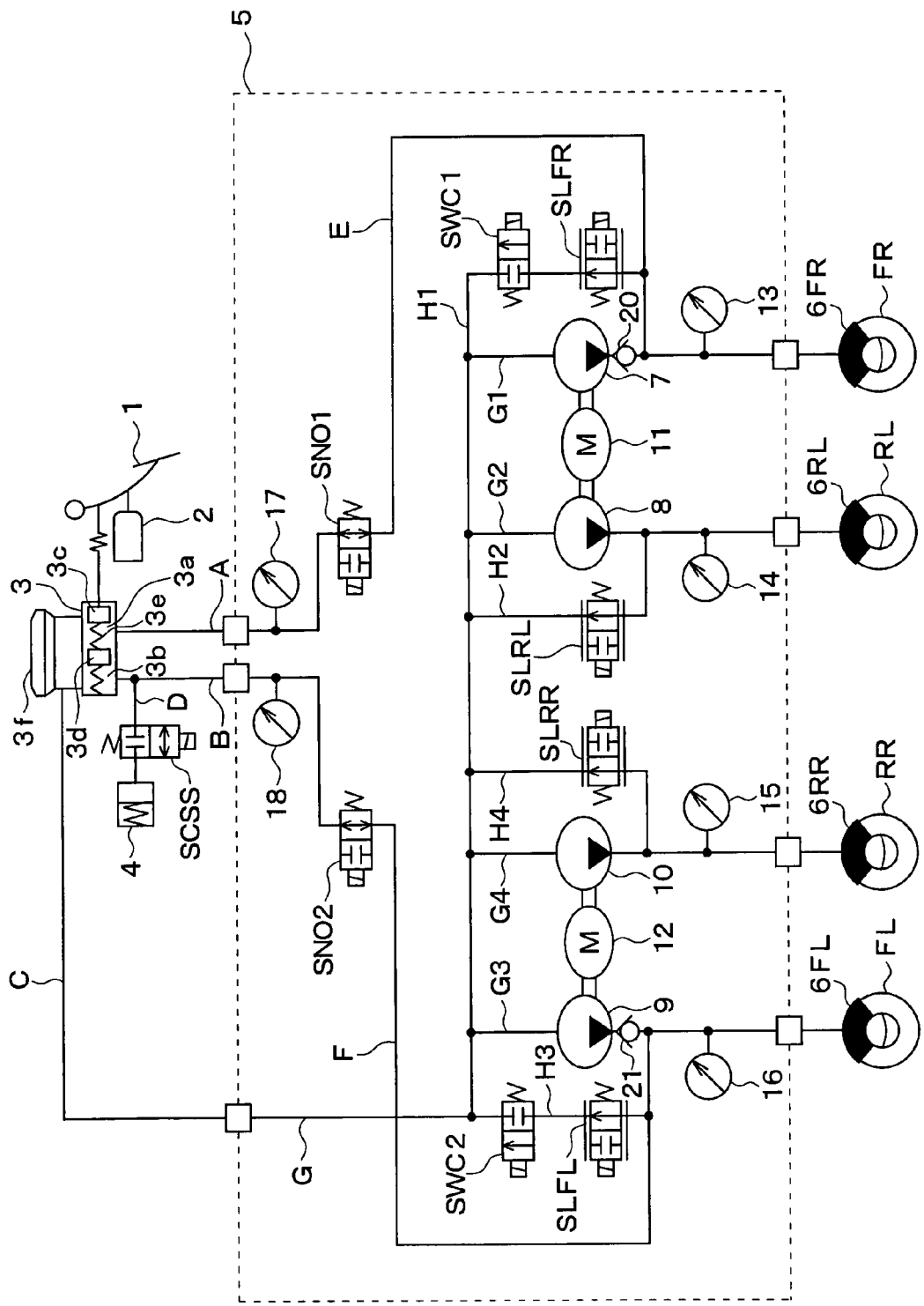
FIG. 1 is a diagram showing a hydraulic circuit configuration of a vehicle brake control device according to a first embodiment of the present invention.

Embodiments of the present invention will be explained below with reference to the drawings. In the embodiments below, identical reference symbols are used in the drawings to represent identical or equivalent elements.

First Embodiment

The vehicle brake control device according to a first embodiment of the present invention is applied to a vehicle with an X-shaped hydraulic circuit including two conduit paths, one of which serves the right front wheel and the left rear wheel and the other of which serves the left front wheel and the right rear wheel.

As shown in FIG. 1, the vehicle brake control device includes a brake pedal 1, a depression force sensor 2, a master cylinder (hereinafter referred to as an M/C) 3, a stroke control valve SCSS, a stroke simulator 4, a brake fluid pressure control actuator 5, and wheel cylinders (hereinafter referred to as W/Cs) 6FL, 6FR, 6RL, 6RR, as well as a brake ECU 100 shown in FIG. 2.

When the brake pedal 1, which is an example of a brake operating member, is depressed by a driver, the depression force applied to the brake pedal 1 is inputted to the depression force sensor 2, and a detection signal corresponding to the applied depression force is outputted by the depression force sensor 2. The detection signal is inputted to the brake ECU 100, and thus the depression force applied to the brake pedal 1 is detected by the brake ECU 100. Although the depression force sensor 2 is used as an example of an operation amount sensor for detecting an operation amount of the brake operating member, a stroke sensor or the like may also be used as another example of the operation amount sensor. The vehicle brake control device may also be configured such that it detects a state of operation of the brake pedal 1 based on detection signals from a stroke sensor and pressure sensors 17 and 18, which detect an M/C pressure described later.

A push rod or the like is connected with the brake pedal 1 and transmits the applied depression force to the M/C 3. When the push rod or the like is pushed, the M/C pressure is generated in a primary chamber 3a and a secondary chamber 3b, which are provided in the M/C 3.

The M/C 3 includes a primary piston 3c and a secondary piston 3d, which form and demarcates the primary chamber 3a and the secondary chamber 3b. The primary piston 3c and the secondary piston 3d receive an elastic force of a spring 3e, thereby return the brake pedal 1 to its initial position when the brake pedal 1 becomes free from the depression force.

The vehicle brake control device also includes brake conduits A and B, which extend respectively from the primary chamber 3a and the secondary chamber 3b of the M/C 3 to the brake fluid pressure control actuator 5.

The M/C 3 also includes a master reservoir 3f. While the brake pedal 1 is in its initial position, the master reservoir 3f is connected with the primary chamber 3a and the secondary chamber 3b via channels not shown in FIG. 1, supplies brake fluid to the M/C 3, and stores any surplus brake fluid.

A brake conduit C directly extends from the master reservoir 3f to the brake fluid pressure control actuator 5.

The stroke simulator 4 is connected with a brake conduit D extending to the brake conduit B and receives the brake fluid in the secondary chamber 3b. The stroke control valve SCSS, a type of normally-closed two-position valve, is provided in the brake conduit D and controls open and closed states of the brake conduit D. A normally closed two-position valve opens a path to which it is installed while electrical power is supplied to it, and closes the path while electrical power is not supplied to it. The configuration allows the stroke control valve SCSS to control the flow of brake fluid to the stroke simulator 4.

The brake fluid pressure control actuator 5 is configured as described below.

The actuator 5 includes a brake conduit E which is connected with the brake conduit A so that the primary chamber 3a is connected via the brake conduit E with the W/C (first front wheel W/C) 6FR, which corresponds to a front wheel FR. A first normally-open valve (a first control valve) SNO1 is located in the brake conduit E. The first normally-open valve SNO1 is a two-position valve that opens a path to which it is installed while electrical power is not supplied to it, and closes the path while electrical power is supplied to it. The first normally-open valve SNO1 controls the open and closed states of the brake conduit E.

The actuator 5 also includes a brake conduit F which is connected with the brake conduit B so that the secondary chamber 3b is connected via the brake conduit F with the W/C (second front wheel W/C) 6FL, which corresponds to a front wheel FL. A second normally-open valve (a second control valve) SNO2 is located in the brake conduit F. The second normally-open valve SNO2 is a two-position valve that opens a path to which it is installed while electrical power is not supplied to it, and closes the path while electrical power is supplied to it. The second normally-open valve SNO2 thus controls the open and closed states of the brake conduit F.

The actuator also includes a brake conduit G which is connected with the brake conduit C that extends from the master reservoir 3f. The brake conduit G branches into four brake conduits called brake conduits G1, G2, G3, and G4 which are respectively connected with the W/Cs 6FR, 6RL, 6FL, and 6RR, wherein the W/Cs 6FL and 6FR respectively correspond to the front wheels FL and FR, and the W/Cs (first and second rear wheel W/Cs) 6RL and 6RR respectively correspond to the rear wheels RL and RR. Note that the brake conduit G includes the brake conduits G1 to G4.

The brake conduits G1 to G4 are respectively provided with pumps (first to fourth pumps) 7, 8, 9, 10. The pumps 7 to 10 are configured as, for example, trochoid pumps which are effective for quietness. The pumps 7 and 8 are driven by a first motor 11, and the pumps 9 and 10 are driven by a second motor 12. Each of the first motor 11 and the second motor 12 may be of any kind of motor, but a brushless motor is preferable because it increases its rotational speed quickly after it starts rotating.

Brake conduits H1, H2, H3, and H4 are located in parallel with the pumps 7 to 10, respectively.

A first normally-closed valve SWC1 and a first linear valve SLFR are located in series in the brake conduit H1 connected in parallel with the pump 7. The first normally-closed valve SWC1 is located closer than the linear valve SLFR is to the intake side (upstream side) of the pump 7, and the first linear valve SLFR is located closer than the first normally-closed valve SWC1 is to the discharge side (downstream side) of the pump 7. In other words, a return flow returning through the brake conduit H1 to the master reservoir 3f can be controlled by using the first normally-closed valve SWC1.

A second linear valve SLRL is located in the brake conduit H2 connected in parallel with the pump 8.

A second normally-closed valve SWC2 and a third linear valve SLFL are located in series in the brake conduit H3 connected in parallel with the pump 9. The second normally-closed valve SWC2 is located closer than the third linear valve SLFL is to the intake side (upstream side) of the pump 9, and the third linear valve SLFL is located closer than the second normally-closed valve SWC2 is to the discharge side (downstream side) of the pump 9. In other words, a return flow returning through the brake conduit H3 to the master reservoir 3f can be controlled by using the second normally-closed valve SWC2.

A fourth linear valve SLRR is located in the brake conduit H4 connected in parallel with the pump 10.

A first pressure sensor 13, a second pressure sensor 14, a third pressure sensor 16, and a fourth pressure sensor 15 are respectively located in the brake conduits G1 to G4, between the pumps 7 to 10 and the W/Cs 6FR to 6RR, and are configured in such a way that the pressures in each of the W/Cs can be detected. The pressure sensors 17 and 18 are respectively located in the brake conduits E and F on the upstream sides (the M/C 3 sides) of the first and second normally-open valves SNO1, SNO2, and are configured in such a way that an M/C pressure that is generated in the primary chamber 3a and the secondary chamber 3b of the M/C 3 can be detected.

Check valves 20 and 21 are respectively located in the discharge port of the pump 7 which pressurizes the W/C 6FR, and in the discharge port of the pump 9 which pressurizes the W/C 6FL. The check valves 20 and 21 are provided to prevent brake fluid from flowing respectively from the W/Cs 6FR and 6FL to the pumps 7 and 9.

In the vehicle brake control device, a first conduit path includes a hydraulic circuit (a first auxiliary brake conduit) that connects the primary chamber 3a with the W/C 6FR via the brake conduit A and the brake conduit E. The first conduit path also includes a hydraulic circuit (a first main brake conduit) that connects the master reservoir 3f and the W/Cs 6FR and 6RL via the brake conduits C G, G1, and G2. The first conduit path further includes hydraulic circuits (first and second pressure-adjusting brake conduits) having the brake conduits H1 and H2, which are connected in parallel with the pumps 7 and 8, respectively.

Also in the vehicle brake control device, a second conduit path includes a hydraulic circuit (a second auxiliary brake conduit) that connects the secondary chamber 3b and the W/C 6FL via the brake conduit B and the brake conduit F. The second conduit path also includes a hydraulic circuit (a second main brake conduit) that connects the master reservoir 3f and the W/Cs 6FL and 6RR via the brake conduits C, G, G3, and G4. The second conduit path further includes hydraulic circuits (third and fourth pressure-adjusting brake conduits) having the brake conduits H3 and H4, which are connected in parallel with the pumps 9 and 10, respectively.

Figure 2:
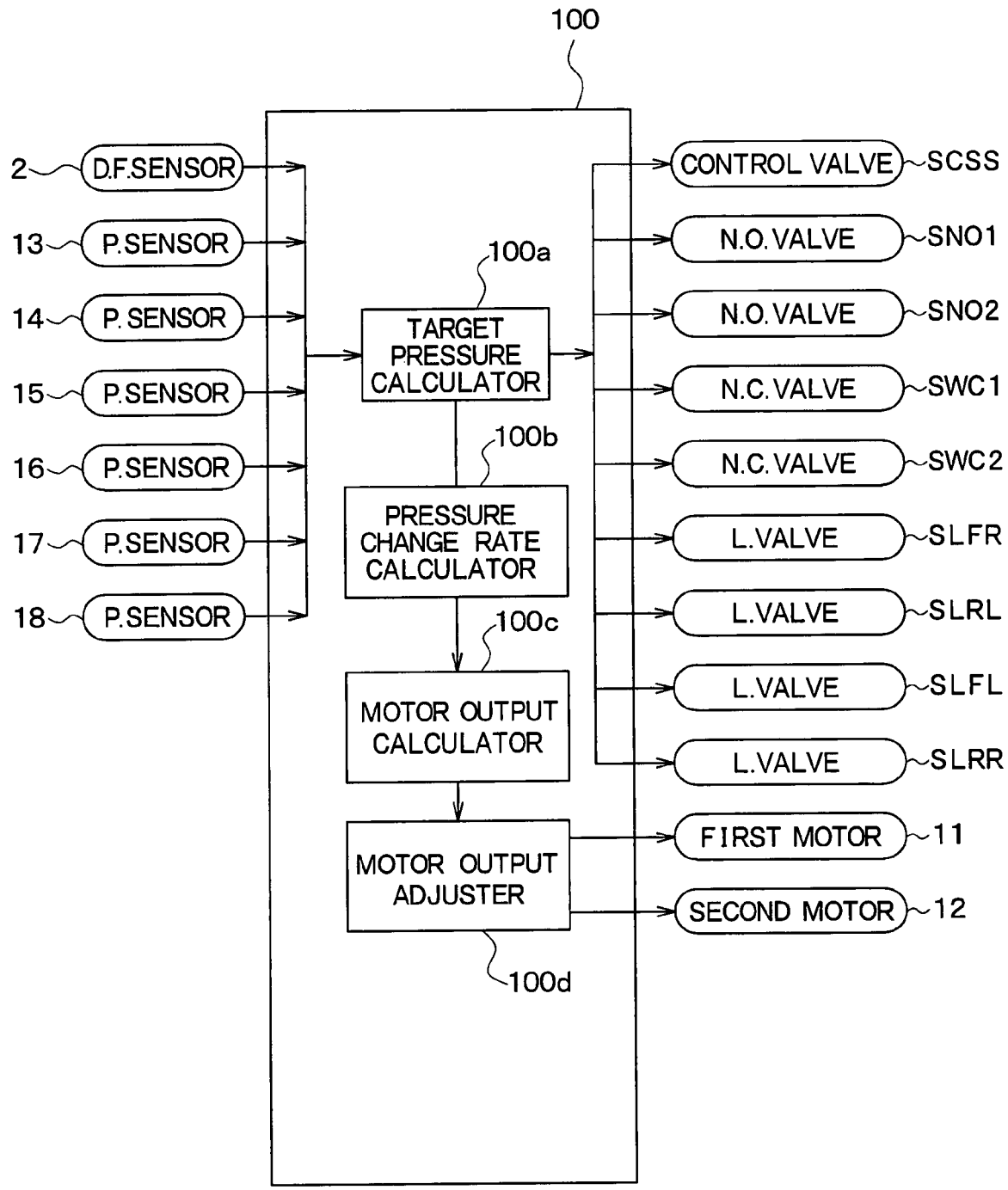
FIG. 2 is a block diagram showing input/output relationships of signals of a brake ECU that controls a control system of the vehicle brake control device shown in FIG. 1.

As shown in FIG. 2, detection signals from the depression force sensor 2 and the pressure sensors 13 to 18 are inputted to the brake ECU 100.

The brake ECU 100 includes a well-known microcomputer which has a CPU, a ROM, a RAM, and an I/O. The brake ECU 100 executes several kinds of processes according to programs stored in the ROM and the like. The brake ECU 100 includes a semiconductor switching element (not shown) for controlling ON/OFF states of power supply lines for the control valves SCSS, SNO1, SNO2, SWC1, SWC2, SLFR, SLRL, SLFL, SLRR, the first motor 11, and the second motor 12. ON/OFF of the power supply to the valves and the motors and an average of current values (in other words, an average of electrical energy consumed per unit time) for the valves and the motors can be controlled by, for example, using the ON/OFF control of the semiconductor switching element.

More specifically, the brake ECU 100 includes a target W/C pressure calculation portion 100a, a target W/C pressure change rate calculation portion 100b, a motor output calculation portion 100c, a motor output adjusting portion 100d, and the like.

The pressure calculation portion 100a calculates a target W/C pressure which is required in order to generate a target braking force. The target W/C pressure is a pressure which is desired to be generated at the W/Cs 6FL, 6FR, 6RL, 6RR in order to generate the target braking force. More specifically, the pressure calculation portion 100a calculates, based on the detection signal from the depression force sensor 2, a physical quantity related to a depression force of the brake pedal 1, the physical quantity corresponding to an amount of operation of the brake pedal 1. Hereinafter, the amount of the operation of the brake pedal 1 is referred to as a brake operation amount. The pressure calculation portion 100a then calculates the target W/C pressure corresponding to the brake operation amount, based on a relational equation or a mapping dataset stored in advance in the brake ECU 100 or the like. The relational equation indicates an algebraic relation between the brake operation amount and the target W/C pressure. The mapping dataset maps discrete values of the brake operation amount respectively to discrete values of the target W/C pressure. A relation indicated by the relational equation and the mapping dataset may be a simple proportional relation between the brake operation amount and the target W/C pressure.

Figure 3:
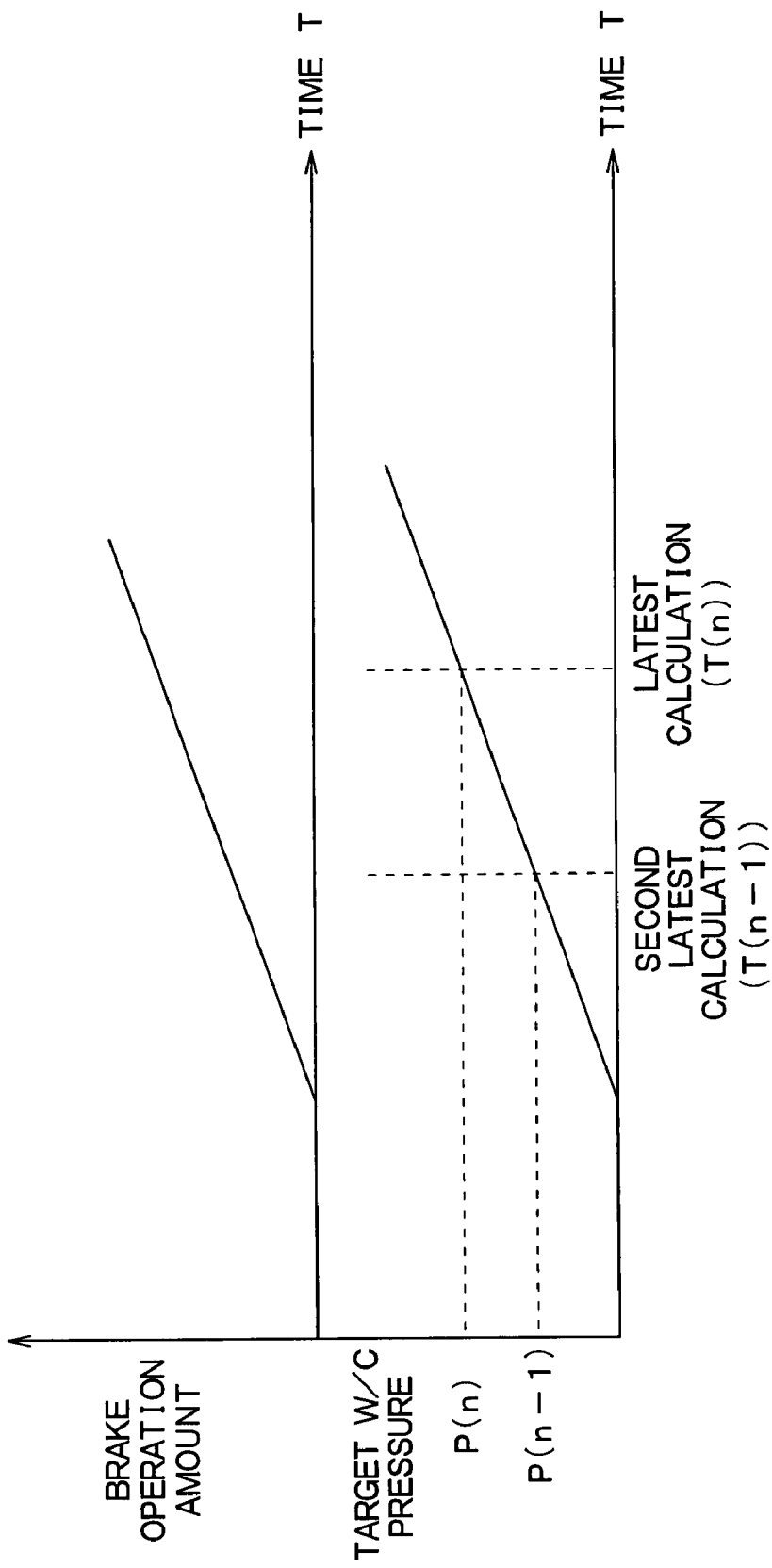
FIG. 3 is a schematic diagram showing a relation between a target W/C pressure and a brake operation amount and a method for determining a change rate of the target W/C pressure.

The pressure change rate calculation portion 100b calculates a change rate of the target W/C pressure based on several results of the calculations of the pressure calculation portion 100a. FIG. 3 is a schematic diagram showing a method for determining, based on the brake operation amount, the target W/C and the change rate of the target W/C. As shown in FIG. 3, the pressure calculation portion 100a calculates the target W/C pressure at every calculation time instant coming periodically at a calculation interval. The pressure change rate calculation portion 100b calculates a difference Δp between a pressure value P(n-1) and a pressure value P(n). The pressure value P(n) is a value for the target W/C pressure calculated at the latest calculation time instant T(n). The pressure value P(n-1) is a value for the target W/C pressure calculated at the second latest calculation time instant T(n-1). The pressure change rate calculation portion 100b then calculates the change rate of the target W/C pressure which is obtained by dividing the difference Δp by the calculation interval ΔT(=T(n)−T(n−1)).

The motor output calculation portion 100c calculates, based on the target W/C factor calculated by the pressure calculation portion 100a, a duty factor of power supply to the first motor 11 and the second motor 12. A duty factor of power supply to a load is, in an operation period for switching between supplying and not supplying electric power to the load, a ratio of a part in which the load is supplied with the electrical power to the periodical period. The duty factor of power supply to the first motor 11 and the second motor 12 is referred to as a motor duty factor.

The motor output calculation portion 100c also calculates another motor duty factor based on the change rate of the target W/C factor calculated by the pressure change rate calculation portion 100b.

The motor duty factor calculated based on the target W/C factor is referred to as a first motor duty factor, and the motor duty factor calculated based on the change rate of the target W/C factor is referred to as a second motor duty factor. The motor output calculation portion 100c determines a for-use motor duty factor based on the first motor duty factor and the second motor duty factor.

More specifically, the motor output calculation portion 100c calculates the first motor duty factor and the second motor duty factor in a manner described below.

(1) The First Motor Duty Factor:

Hereinafter, a rotational speed at which the first and the second motors 11 and 12 achieve stable rotation is referred to as a stable motor rotational speed. At the stable motor rotational speed, the first to fourth linear valve SLFR, SLRL, SLFL, SLRR can be used to adjust stably the pressure at the W/Cs 6FR, 6RL, 6FL, and 6RR. The stable motor rotational speed is predetermined depending on characteristics of the first motor 11 and the second motor 12. The first motor duty factor, which is calculated as a motor duty factor required to achieve the stable rotational speed, changes depending on a torque of the first motor 11 and the second motor 12.

Figure 4:
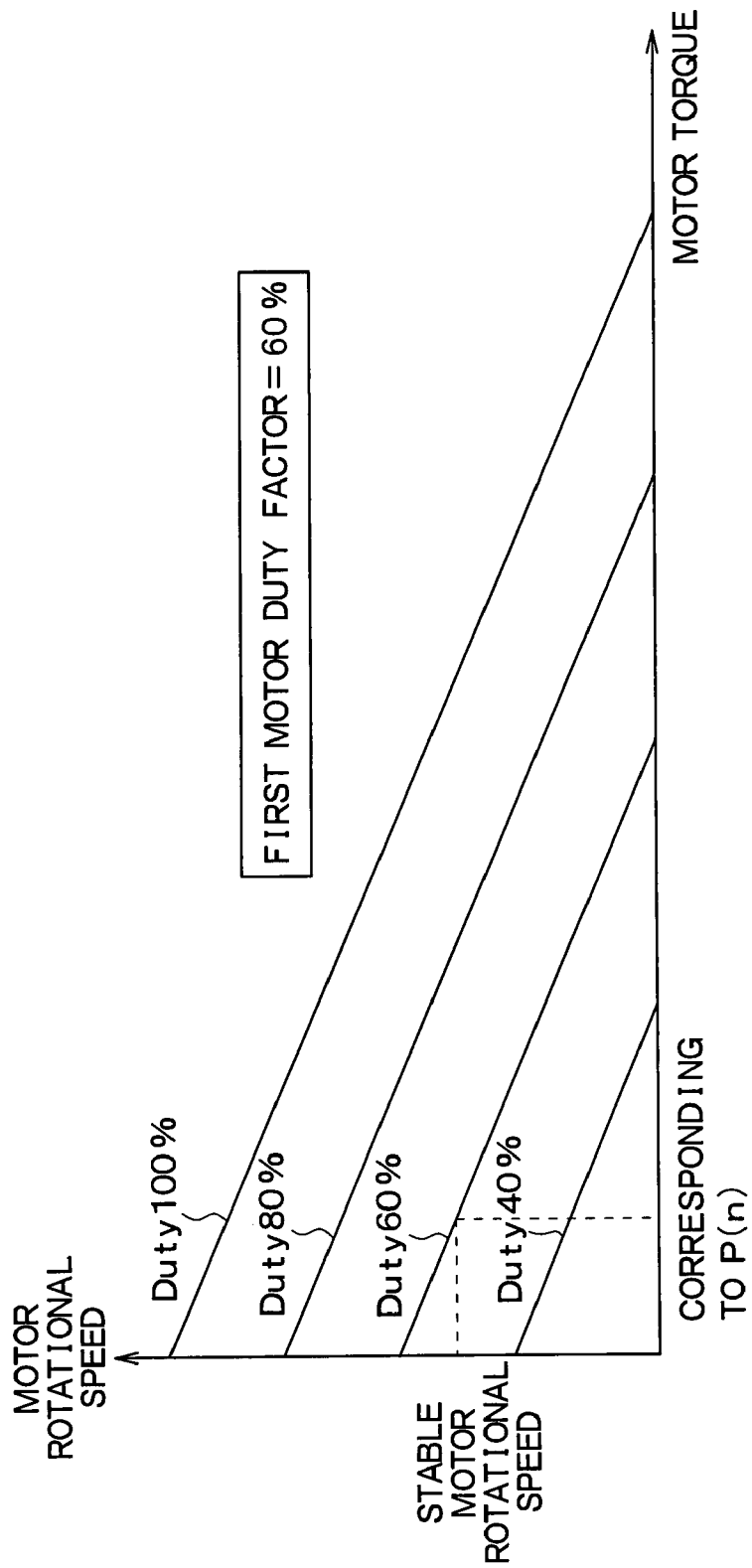
FIG. 4 is a schematic diagram showing a method for determining a first motor duty factor by using a characteristic relation between a motor torque and a motor rotational speed of first and second motors.

FIG. 4 shows a relation between the torque and the rotational speed of the first and second motors 11 and 12 for several values of the first duty factor. In another aspect, FIG. 4 shows a characteristic relation among a duty factor, a torque of the motors 11, 12, and a rotational speed of the motors 11, 12. The characteristic relation is predetermined in the brake ECU 100. As shown in the drawing, the relation varies based on the first motor duty factor. Therefore, the first motor duty factor required to achieve the stable rotational speed changes depending on the torque of the first motor 11 and the second motor 12. For example, when the torque of the motors 11 and 12 has the value indicated in FIG. 4, the first motor duty factor required to achieve the stable rotational speed is 60%.

The torque of the first and second motors 11 and 12 has a correspondence with the W/C pressure at the W/C 6FR to 6RR. Therefore, the torque of the motors 11 and 12 is determined based on the pressure value P(n) of the target W/C pressure calculated by the pressure calculation portion 100a at the latest calculation time instant T(n). Therefore, the motor output calculation portion 100c can calculate, based on the W/C pressure calculated by the pressure calculation portion 100a, the first motor duty factor required to achieve the stable rotational speed.

Figure 5:
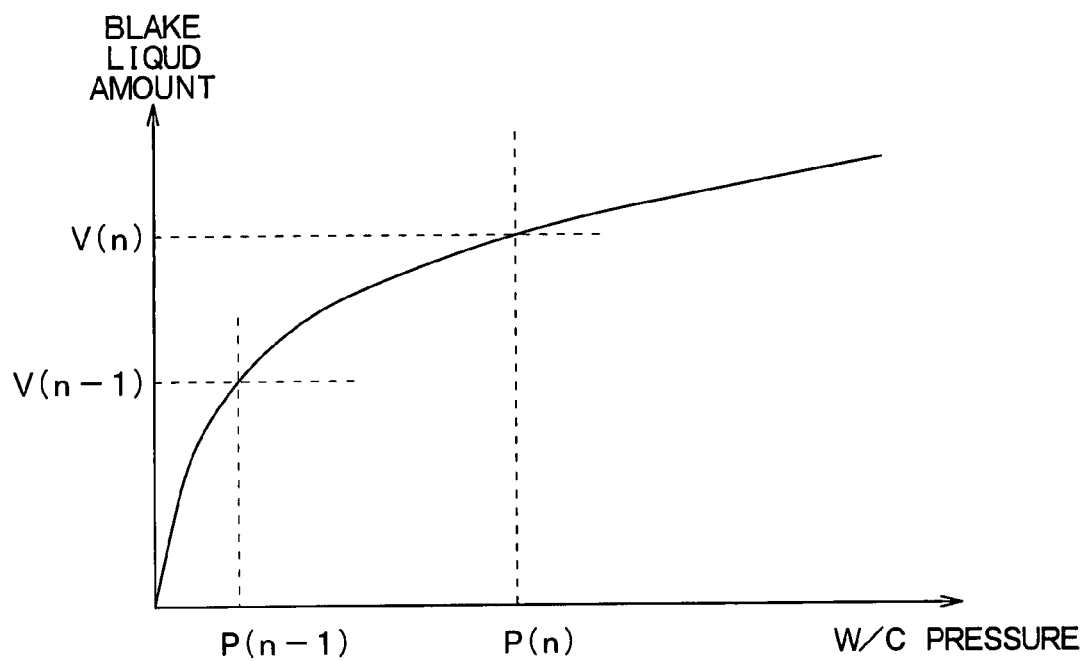
FIG. 5 is a characteristic diagram showing a relation between the target W/C pressure and a brake fluid amount required to generate the target W/C pressure.

(2) The Second Motor Duty Factor:

FIG. 5 shows a relation between the target W/C pressure and an amount of brake fluid required to generate the target W/C pressure. By using the relation shown in FIG. 5, the motor output calculation portion 100c calculates brake fluid amounts V(n−1) and V(n). The brake fluid amount V(n) is an amount of the brake fluid corresponding to the pressure value P(n) of the target W/C pressure calculated by the pressure calculation portion 100a at the latest calculation time period T(n). The brake fluid amount V(n−1) is an amount of the brake fluid corresponding to the pressure value P(n−1) of the target W/C pressure calculated by the pressure calculation portion 100a at the second latest calculation time period T(n−1). Then the motor output calculation portion 100c calculates a pump output rate Qtarget which is equal to a value ΔV/ΔT [cc/s] obtained by dividing the difference ΔV between the brake fluid amount V(n−1) and the brake fluid amount V(n) by the calculation interval ΔT. The pump output rate Qtarget is a change rate of an amount of the brake fluid outputted by the pumps 7 to 10 which is required in order to achieve the change rate of the target W/C pressure.

Figure 6:
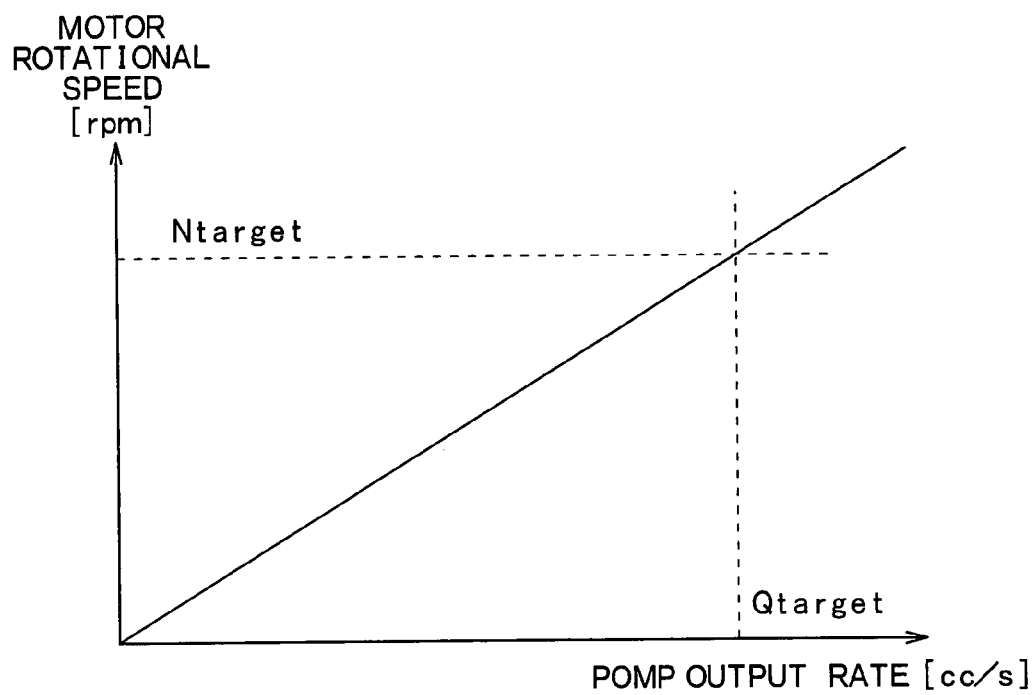
FIG. 6 is a schematic diagram showing a characteristic relation between a pump output rate Qtarget and a rotational speed Ntarget required for the first and second motors.

A rotational speed Ntarget required for the first motor 11 and the second motor 12 is calculated by using the equation below:

$$N\text{target} = Q\text{target} \times 60 / V\text{pump [rpm]},$$

wherein the amount Vpump [cc] is an amount of the brake fluid outputted per a 360-degree rotation by the first to fourth pumps 7 to 10. The relation expressed by the equation is illustrated in FIG. 6.

Figure 7:
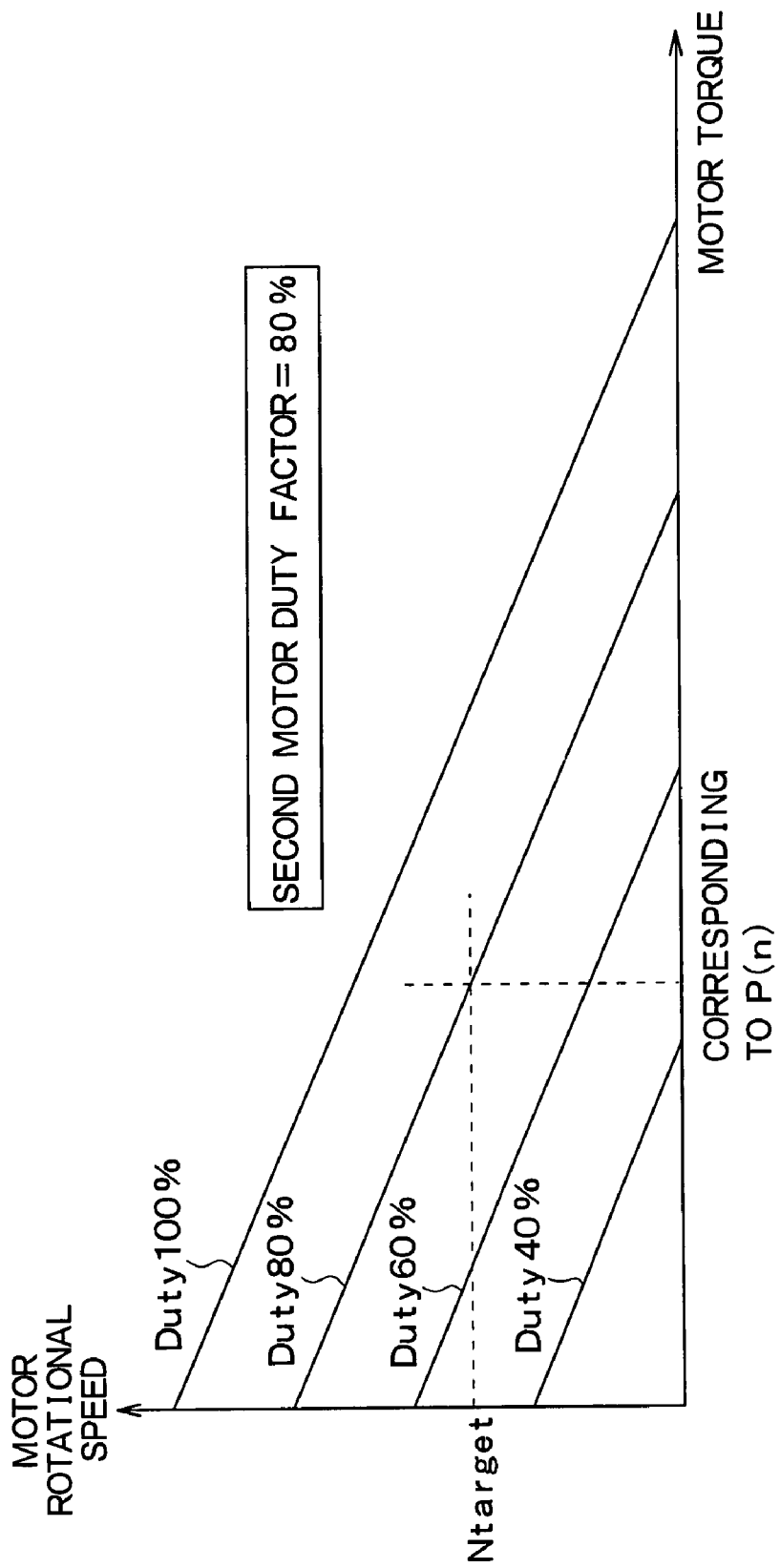
FIG. 7 is a schematic diagram showing a method for determining a second motor duty factor by using a characteristic relation between a motor torque and a motor rotational speed of the first and second motors.

The rotational speed Ntarget is a rotational speed of the motors required in order to achieve the change rate ΔP/ΔT of the target W/C pressure calculated by the pressure change rate calculation portion 100b. The second motor duty factor, which is calculated as a motor duty factor required to achieve the rotational speed Ntarget, is determined by using relations between the torque of the motors and the rotational speed of the motors for several values of the second motor duty factor shown in FIG. 7. In another aspect, FIG. 7 shows a characteristic relation among a duty factor, a torque of the motors 11, 12, and a rotational speed of the motors 11, 12. The characteristic relation is predetermined in the brake ECU 100. More specifically, the second motor duty factor is obtained as a motor duty factor of a characteristic line including a cross point in FIG. 7 of the rotational speed Ntarget and the pressure value P(n) of the target W/C pressure calculated by the pressure calculation portion 100a at the latest calculation time instant T(n).

Thus, the first motor duty factor is a motor duty factor required to achieve the stable rotation of the motors, and the second motor duty factor is a duty factor required to achieve the change rate ΔP/ΔT of the target W/C pressure. Therefore, by applying the larger one of the first and the second motor duty factors to the motors 11 and 12, both of the stable rotation of the motors and the change rate of the target W/C pressure are achieved.

Therefore, the motor output calculation portion 100c calculates the first and second motor duty factors in the manner as described above and selects one of the first and second motor duty factors as the for-use motor duty factor to be used actually in supplying the electrical power to the motors 11 and 12.

The motor output adjusting portion 100*d* adjusts the currents supplied to the first and second motors 11 and 12 based on the result of calculation of the motor output calculation portion 100*c*. For example, the motor output adjusting portion 100*d* controls ON/OFF operation of the semiconductor switching element located on the power supply lines to the motors 11 and 12. Thus, an average of current values (in other words, an average of electrical energy consumed per unit time over the operation period of the motors 11 and 12) for the motors 11 and 12 are controlled by the motor output adjusting portion 100*d*, and the current having the calculated current value is accordingly supplied to the first and the second motors 11 and 12.

The brake ECU 100 generates the W/C pressure at each of the W/C 6FR to 6RR by outputting, based on the results of calculations of the pressure calculation portion 100*a* and the pressure change rate calculation portion 100*b*, control signals for driving the valves SCSS, SNO1, SNO2, SWC1, SWC2, SLFR, SLRL, SLFL, SLRR, the first motor 11, and the second motor 12. Then the brake ECU 100 detects the W/C pressure and the M/C pressure based on the detection signals from the pressure sensors 13 to 18 to loop back the actually generated braking force (an actual braking force) to an operation for making the actual braking force closer to a target braking force.

The control signals for driving the valves SCSS, SNO1, SNO2, SWC1, SWC2, SLFR, SLRL, SLFL, SLRR, the first motor 11, and the second motor 12 is supported by power supply from an on-board battery (not shown).

The operation of the brake control device during normal braking and in an abnormal situation will be explained below separately.

FIG. 8 is a table showing the operating states of portions of the vehicle brake control device during the normal braking and in the abnormal situation. The brake ECU 100 determines, by executing a conventional initial check or the like, whether or not the abnormal situation has arose. If the abnormal situation arises, abnormal-state braking operation is executed until the abnormal situation goes away. Hereinafter, the operation during the normal braking and in the abnormal situation will be explained with reference to FIG. 8.

(1) Operation During the Normal Braking

During normal braking, when the brake pedal 1 is depressed and the detection signal from the depression force sensor 2 is inputted to the brake ECU 100, the brake ECU 100 operates the various control valves SCSS, SNO1, SNO2, SWC1, SWC2, SLFR, SLRL, SLFL, SLRR, and the first and second motors 11, 12 such that they are in the operating states shown in FIG. 8.

More specifically, based on the detection signal from the depression force sensor 2, the brake ECU 100 controls the pressure calculation portion 100*a* to calculate the target W/C pressure and also controls the pressure change rate calculation portion 100*b* to calculate the change rate of the target W/C pressure. Based on the results of the calculations, the brake ECU 100 controls the motor output calculation portion 100*c* to determine the first motor duty factor and the second motor duty factor in the manner described above. The brake ECU 100 further controls the motor output calculation portion 100*c* to compare these motor duty factors with each other and select the larger one of the motor duty factors as the for-use motor duty factor to be used in outputting power supply to the motors 11 and 12. Based on the determined for-use motor duty factor, the brake ECU 100 controls the motor output adjusting portion 100*d* to, for example, control the ON/OFF operation of the semiconductor switching element located on the power supply lines to the motors 11 and 12 in order to control the average of the current values for the motors 11 and 12.

When the currents are supplied to the first motor 11 and the second motor 12, the pumps 7 to 10 draw in and discharge the brake fluid which is supplied to the W/Cs 6FR to 6RR.

Electric power to both the first and second normally-open valves SNO1 and SNO2 is turned to ON, and electric power to both the first and second normally-closed valves SWC1 and SWC2 is turned to ON. Therefore, the first and second normally-open valves SNO1 and SNO2 are both put into a closed state, and the first and second normally-closed valves SWC1 and SWC2 are both put into an open state.

The ON/OFF switching of electric power to the first to fourth linear valves SLFR, SLRL, SLFL, SLRR is subject to duty control (or PWM control) under which the amount of electric power supplied per unit time to the linear valves is controlled in such a way that the pressure differences between the upstream and downstream sides of the linear valves are controlled linearly. Electric power to the stroke control valve SCSS is turned to ON, causing the stroke simulator 4 to be connected with the secondary chamber 3*b* through the brake conduits B and D. In this case, the brake fluid in the secondary chamber 3*b* moves to the stroke simulator 4 when the brake pedal is depressed and the pistons 3*c* and 3*d* move. Therefore, when the driver depresses the pedal 1, a reaction force corresponding to an amount of the depression is generated. The brake pedal 1 can hence be depressed without making the driver feel that depressing the brake pedal 1 becomes like pressing a hard board (i.e. giving board feeling) as a result of the increase in the master cylinder pressure.

Since the first and second normally-open valves SNO1 and SNO2 are in a closed state at this time, the brake fluid pressures downstream of the pumps 7 to 10, that is, the W/C pressures of the W/Cs 6FR to 6RR, are increased when the pumps 7 to 10 discharges the brake fluid.

However, since the first and second normally-closed valves SWC1 and SWC2 are in an open state and the average amount of electric energy supplied per unit time to the first to fourth linear valves SLFR, SLRL, SLFL, and SLRR are subject to duty control, the W/C pressures of the W/Cs 6FR to 6RR are adjusted according to duty factors of the current value for the linear valves SLFR, SLRL, SLFL, and SLRR.

The brake ECU 100 monitors the W/C pressures in the W/Cs 6FR to 6RR based on the detection signals from the pressure sensors 13 to 16. The brake ECU 100 accordingly adjusts the W/C pressures to desired values by adjusting the amounts of electric power supplied to the first and second motors 11 and 12 to control the revolution speeds thereof and by controlling the ON/OFF duty ratios for the electric power that is supplied to the first to fourth linear valves SLFR, SLRL, SLFL, and SLRR.

Thus, braking force is generated to achieve the target braking force corresponding to the depression force applied to the brake pedal 1.

(2) Abnormal-State Braking Operation

When an abnormal situation arises in the vehicle brake control device, there is a possibility that control signals cannot be outputted from the brake ECU 100, or that some of the control valves SCSS, SNO1, SNO2, SWC1, SWC2, SLFR, SLRL, SLFL, SLRR or the first and second motors 11, 12 do not work properly. In this case, electric power to the various control valves SCSS, SNO1, SNO2, SWC1, SWC2, SLFR, SLRL, SLFL, SLRR and the first and second motors 11, 12 is turned to OFF as shown in FIG. 8.

Since the electric power to both the first and second normally-open valves SNO1 and SNO2 is turned to OFF, both valves SNO1 and SNO2 are in the open states. Since the electric power to both the first and second normally-closed valves SWC1 and SWC2 is turned to OFF, both valves SWC1 and SWC2 are in the closed states.

Since the electric power to all of the first to fourth linear valves SLFR, SLRL, SLFL, and SLRR is turned to OFF, they are in the open states. Since electric power to the stroke control valve SCSS is also turned to OFF, the stroke simulator 4 and the secondary chamber 3b are cut off from each other.

Since the electric power to the first and second motors 11 and 12 is turned to OFF, the pumps 7 to 10 stop drawing in and discharging the brake fluid.

At this time, the primary chamber 3a of the M/C 3 is in a state in which it is connected with the W/C 6FR in the right front wheel FR via the brake conduits A, E, and G1, and the secondary chamber 3b is in a state in which it is connected with the W/C 6FL in the left front wheel FL via the brake conduits B, F, and G3.

Therefore, if the brake pedal 1 is depressed and the push rod or the like is pushed according to the applied depression force, the M/C pressure is generated in the primary chamber 3a and the secondary chamber 3b and the M/C pressure is transmitted to the W/Cs 6FR and 6FL. Braking force is thereby generated for both front wheels FR and FL.

In the abnormal-state braking operation described above, the W/C pressures in the W/Cs 6FR and 6FL on the front wheels also takes effect in the brake conduits G1 and G3. However, the check valves 20 and 21 prevent the W/C pressures from bearing on the pumps 7 and 9 and thereby prevent the brake fluid leaking through the pumps 7 and 9. The W/C pressures therefore are not decreased because of leaking of the brake fluid.

As described above, the vehicle brake control device determines the first motor duty factor required to achieve the stable motor rotational speed and the second motor duty factor required to achieve the change rate of the target W/C pressure. The vehicle brake control device selects the larger one of the determined motor duty factors as the for-use motor duty factor to be used in outputting the currents to the motors 11 and 12.

Therefore, with the stable motor rotational speed and the change rate of the target W/C pressure, it is possible to achieve quick response to a request for braking made by the driver while suppressing the electric energy consumption of the motors.

Second Embodiment

A second embodiment of the present invention will be explained. In this embodiment, a portion of the configuration of the vehicle brake control device is different from the configuration in the first embodiment, but the overall configuration is basically the same as that in the first embodiment, so only the parts which are different from the first embodiment will be explained.

Figure 9:
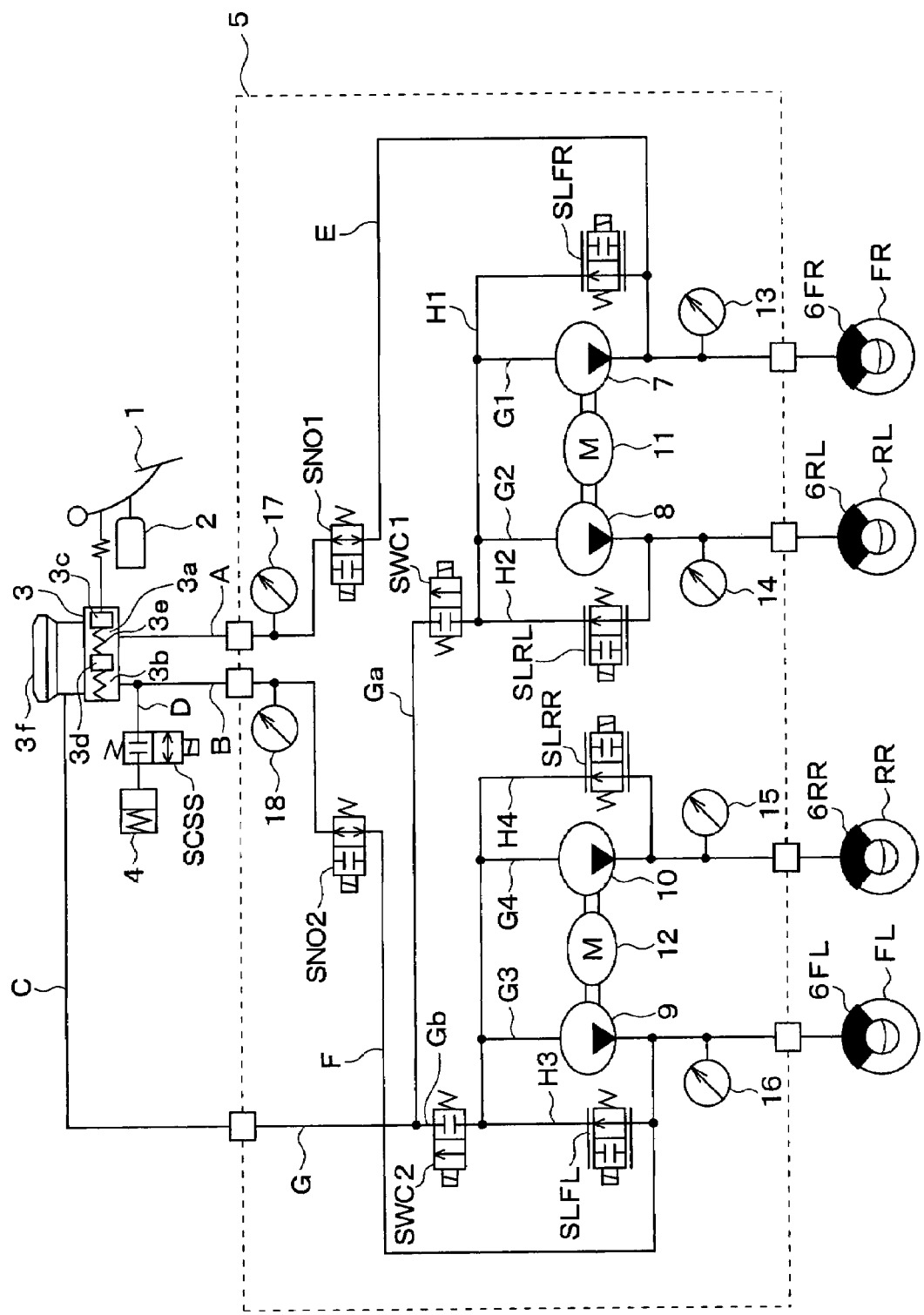
FIG. 9 is a diagram showing a hydraulic circuit configuration of a vehicle brake control device according to a second embodiment of the present invention.

FIG. 9 is a diagram showing a hydraulic circuit configuration of a vehicle brake control device according to this embodiment. As shown in FIG. 5, in the vehicle brake control device in this embodiment, the brake conduit G is divided into two brake conduits Ga and Gb. The first normally-closed valve SWC1 is located in the brake conduit Ga (that is, downstream of the dividing point of the conduits Ga and Gb and upstream of the brake conduits H1 and H2). The second normally-closed valve SWC2 is located in the brake conduit Gb (that is, downstream of the dividing point and upstream of the brake conduits H3 and H4).

With the above structure, the vehicle brake control device determines the first motor duty factor required to achieve the stable motor rotational speed and the second motor duty factor required to achieve the change rate of the target W/C pressure. The vehicle brake control device selects the larger one of the determined motor duty factors as the for-use motor duty factor to be used in outputting the currents to the motors 11 and 12. Thus, the vehicle control device according to the present embodiment achieves an effect similar to that of the first embodiment.

In this configuration, even if the first normally-closed valve SWC1 is closed when an abnormality occurs, only the portion of the system on the upstream side of the brake conduits H1 and H2 is closed. Therefore, if the M/C pressure is generated in the primary chamber 3a of the M/C 3 because of depressing of a brake pedal 1, the M/C pressure can be transmitted not only to the W/C 6FR for the right front wheel FR, but also to the W/C 6RL for the left rear wheel RL. Likewise, even if the second normally-closed valve SWC2 is closed when an abnormality occurs, only the portion of the system on the upstream side of the brake conduits H3 and H4 is closed. Therefore, if the M/C pressure is generated in the secondary chamber 3b of the M/C 3 because of depressing of the brake pedal 1, the M/C pressure can be transmitted not only to the W/C 6FL for the left front wheel FL, but also to the W/C 6RR for the right rear wheel RR.

Thus, in the vehicle brake control device in this embodiment, it is possible to generate the W/C pressures in the W/Cs 6FR to 6RR for all four wheels FR to RR in the abnormal situation. Better balanced braking forces can therefore be generated.

In this embodiment, check valves 20 and 21, which were shown in the first embodiment, are not provided. However, the first and second normally-closed valves SWC1 and SWC2, which are located upstream of the pumps 7 and 9, can stop the brake fluid so that no drop occurs in the W/C pressures even if the brake fluid leaks from pumps 7 and 9.

Third Embodiment

A third embodiment of the present invention will be explained. In this embodiment, a portion of the configuration of the vehicle brake control device is different from the configuration in the second embodiment, but the overall configuration is basically the same as that in the second embodiment, so only the parts which are different from the second embodiment will be described.

Figure 10:
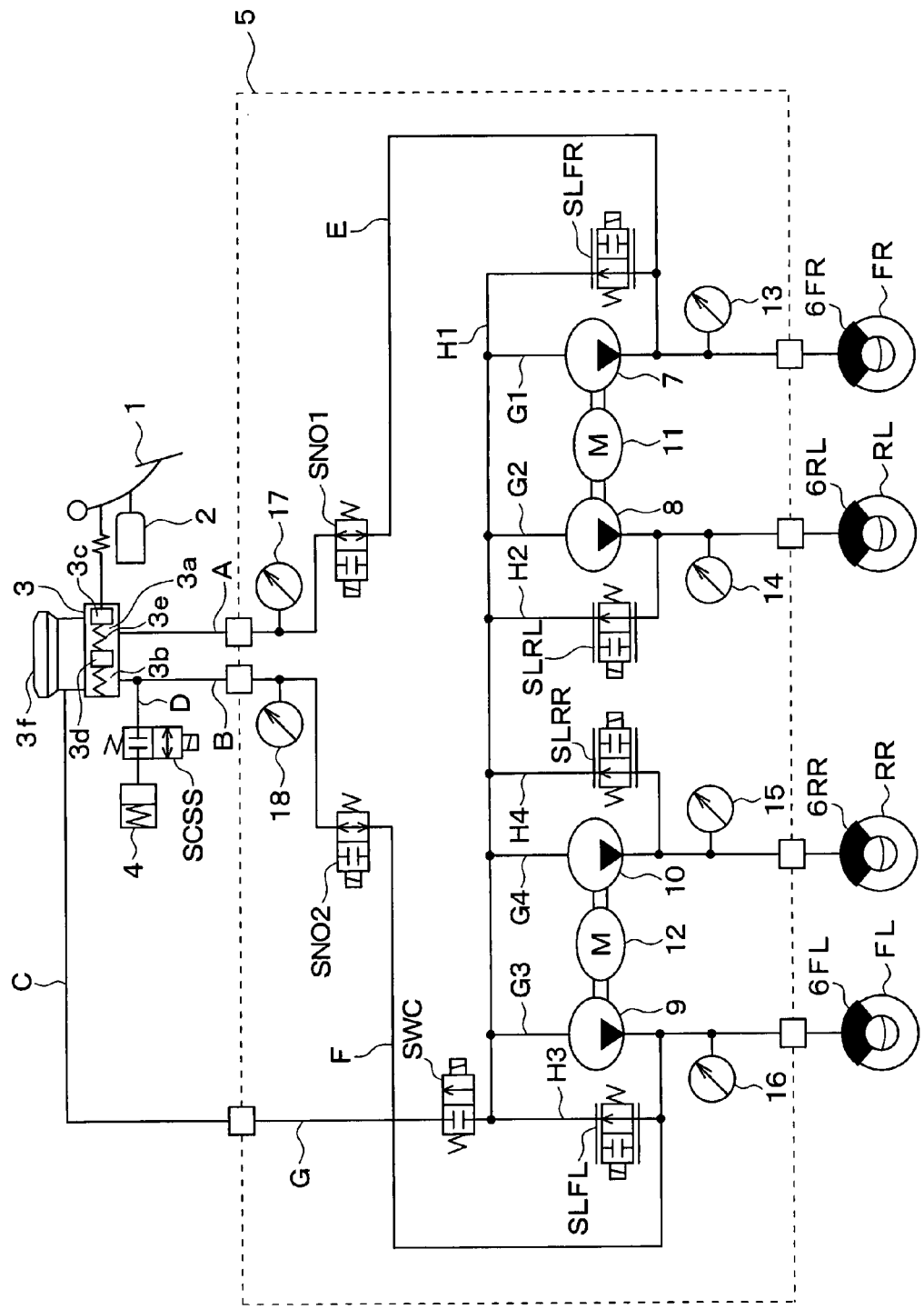
FIG. 10 is a diagram showing a hydraulic circuit configuration of a vehicle brake control device according to a third embodiment of the present invention.

FIG. 10 is a diagram showing a hydraulic circuit configuration of a vehicle brake control device according to this embodiment. As shown in FIG. 10, in the vehicle brake control device in this embodiment, the two conduit paths share a single normally-closed valve SWC, instead of the first and second normally-closed valves SWC1 and SWC2 provided in the first and second embodiments.

With the above structure, the vehicle brake control device determines the first motor duty factor required to achieve the stable motor rotational speed and the second motor duty factor required to achieve the change rate of the target W/C pressure. The vehicle brake control device selects the larger one of the determined motor duty factors as the for-use motor duty factor to be used in outputting the currents to the motors 11 and 12. Thus, the vehicle control device according to the present embodiment achieves an effect similar to that of the first embodiment.

Even in this configuration, during the normal braking, W/C pressures in the W/Cs 6FR to 6RR for the four wheels FR to RR can be adjusted appropriately, and when an abnormality occurs, the M/C pressure that is generated in the M/C 3 according to depressing of a brake pedal 1 can be transmitted to the W/Cs 6FR to 6RR for the four wheels FR to RR.

In addition, the single normally-closed valve SWC is closed in the abnormal situation. The M/C pressure is accordingly transmitted to all wheels FR to RR in the two conduit paths. Therefore, it is possible to make the system configuration more compact.

In the vehicle brake control device in this embodiment, the way for driving the normally-closed valve SWC is the same as that for driving the first and second normally-closed valves SWC1 and SWC2 in the vehicle brake control device according to the first embodiment, as shown in FIG. 8.

Other Embodiments

The vehicle brake control device shown in FIG. 1 is merely an example of the present invention. The vehicle brake control device of the present invention is not limited by that shown in FIG. 1, but may be modified in a variety of ways.

For example, in the first embodiment, examples were explained of vehicle brake control devices applied to a vehicle in which conduit paths include hydraulic circuits in an X conduit arrangement, with a conduit path connecting the left front and right rear wheels and another conduit path connecting the right front and left rear wheels. However, the present invention may also be applied to other systems, such as a front-and-rear conduit arrangement or the like. In the front and-rear-conduit arrangement, a conduit path connecting the left front and right front wheels and another conduit path connecting the right rear and left rear wheels are provided.

In the above embodiments, the brake fluid is supplied to both the first conduit path and the second conduit path through the brake conduit C which is the only conduit connected with the master reservoir 3f. However, supplemental brake conduit other than the brake conduit C connected may be provided. In this case, the brake fluid may be supplied to the first conduit path through the brake conduit C and to the second conduit path through the supplemental brake conduit.

In the above embodiments, the M/C 3 is connected with the first conduit path and the second conduit path in case of the abnormal situation in which the first to four pumps 7 to 10 cannot generate pressure. In addition, in the above embodiments, the brake fluid is supplied from the master reservoir 3f during the normal braking. However, the operation is merely an example of the present invention. The M/C 3 may be separated from the first conduit path and the second conduit path. The M/C 3 may be disused. The brake fluid may be supplied not from the master reservoir 3f but from another reservoir which can store the brake fluid.

Figure 11:
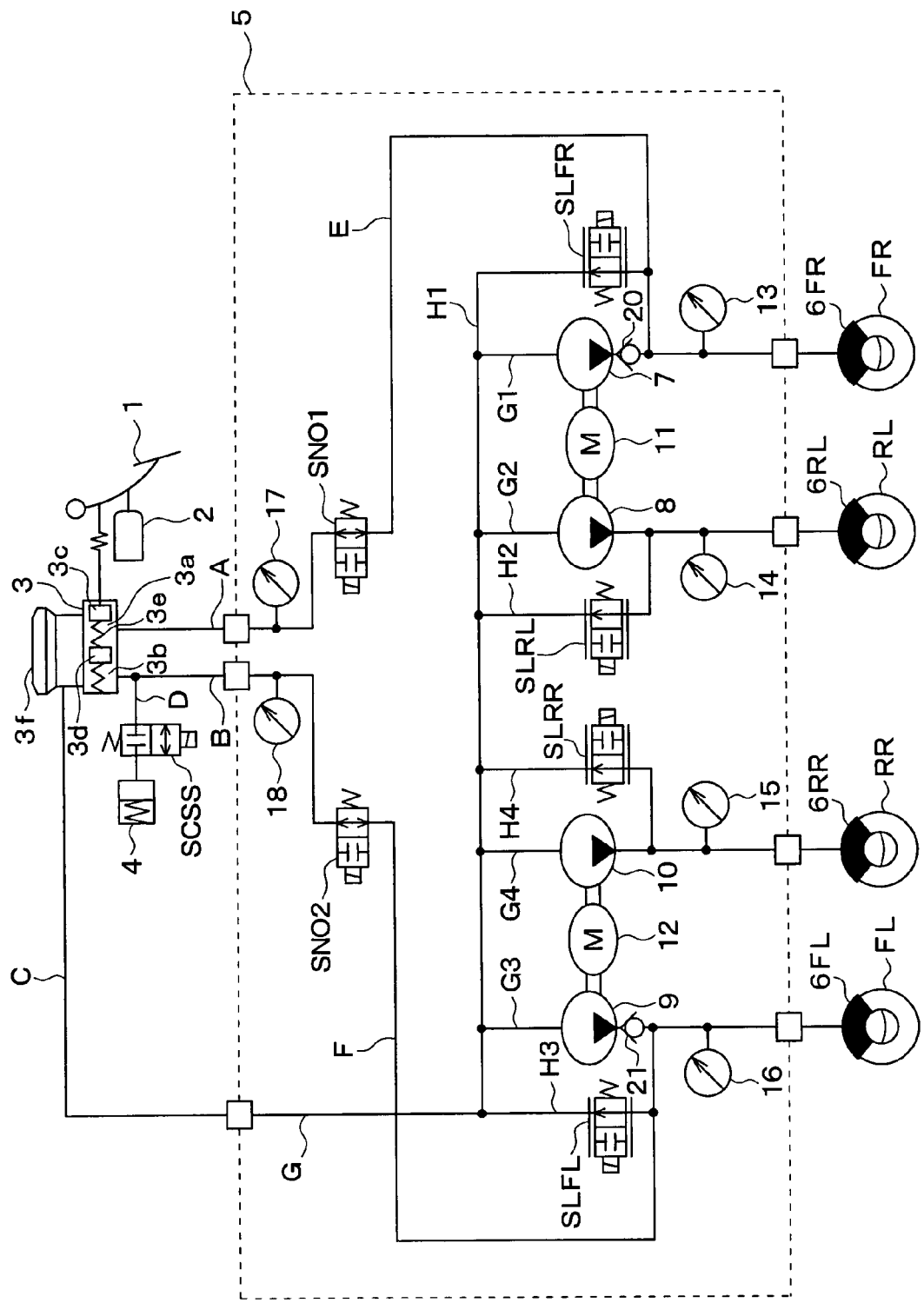
FIG. 11 is a diagram showing a hydraulic circuit configuration of a vehicle brake control device according to another embodiment of the present invention.

Also, in the preceding embodiments, even if the first to fourth linear valves SLFR to SLRR do not operate, the M/C pressure that is generated mechanically based on depressing of the brake pedal 1 is transmitted to the W/Cs 6FL, 6FR and the like in consideration of the need for fail-safe operation. However, if a location where an abnormality occurs is somewhere other than the first to fourth linear valves SLFR to SLRR, the first to fourth linear valves SLFR to SLRR can operate. So if electric power can be supplied to the first to fourth linear valves SLFR to SLRR so that the brake conduits H1 to H4 are closed (or, so that a pressure difference between an upstream and an downstream of each of the brake conduits H1 to H4 is maximized), it would be possible to transmit the M/C pressure to the W/Cs 6FL, 6FR and the like in the same manner as described above. Therefore, it is not necessarily the case that the first and second normally-closed valves SWC1, SWC2 or the single normally-closed valve SWC must be provided. As shown in the hydraulic circuit configuration shown in FIG. 11, a structure may also be used that is not provided with the first and second normally-closed valves SWC1, SWC2 or with the single normally-closed valve SWC.

However, in the sense that all fail-safe operations must be able to be executed mechanically, the first and second normally-closed valves SWC1 and SWC2 and the single normally-closed valve SWC are important.

Figure 12:
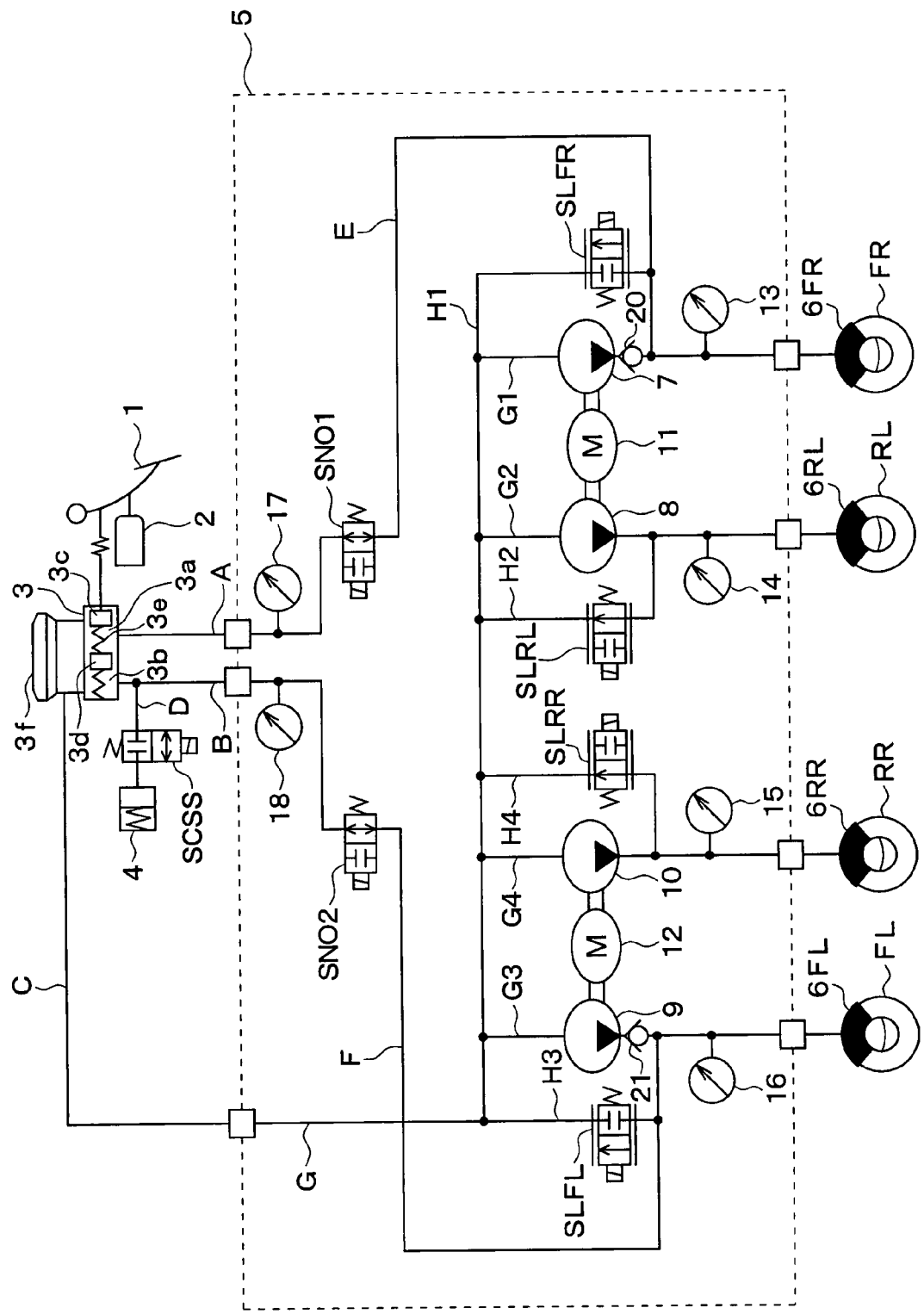
FIG. 12 is a diagram showing a hydraulic circuit configuration of a vehicle brake control device according to still another embodiment of the present invention.

Therefore, as shown in the hydraulic circuit configuration shown in FIG. 12, it is more preferable if the first linear valve SLFR and the third linear valve SLFL are configured as normally-closed linear valves, because the fail-safe operation can be executed mechanically. Of course, the second linear valve SLRL and the fourth linear valve SLRR may also be configured as normally-closed linear valves.

In the above embodiments, the brake pedal 1 serves as an example of a brake operating member. However, a brake lever and the like may serve as and example of the brake operating member.

What is claimed is:

1. A vehicle brake control device, comprising:
   a brake operating member to be operated by a driver;
   an operation amount sensor for detecting an operation amount of the brake operating member;
   first and second front wheel cylinders, which are respectively installed to two front wheels;
   first and second rear wheel cylinders, which are respectively installed to two rear wheels;
   a reservoir for storing brake fluid;
   a main conduit for connecting the first and second front wheel cylinders and the first and second rear wheel cylinders with the reservoir, the main conduit branching into four sections which are respectively connected with the first and second front wheel cylinders and the first and second rear wheel cylinders;
   a first pump located in a first one of the four sections, the first pump for pressurizing the first front wheel cylinder by drawing in and discharging the brake fluid stored in the reservoir;
   a second pump located in a second one of the four sections, the second pump for pressurizing the first rear wheel cylinder by drawing in and discharging the brake fluid stored in the reservoir;
   a third pump located in a third one of the four sections, the third pump for pressurizing the second front wheel cylinder by drawing in and discharging the brake fluid stored in the reservoir;
   a fourth pump located in a fourth one of the four sections, the fourth pump for pressurizing the second rear wheel cylinder by drawing in and discharging the brake fluid stored in the reservoir;
   a first motor for driving the first and second pumps which are provided to a first conduit path of the main conduit and pressurize the first conduit path;
   a second motor for driving the third and fourth pumps which are provided to a second conduit path of the main conduit and pressurize the second conduit path;
   first to fourth adjustment conduits, which are located respectively in parallel with the first to fourth pumps and return the brake fluid to the reservoir;
   first to fourth linear valves, which are respectively located in the first to fourth adjustment conduits; and a control means for controlling, based on a detection signal from the operation amount sensor, the first to fourth linear valves, the first motor, and the second motor so as to change a current value for supplying to the first motor and the second motor according to a target wheel cylinder pressure which corresponds to the detected operation amount of the brake operating member, wherein the control means includes:

a first calculation portion for calculating the target wheel cylinder pressure according to the detected operation amount of the brake operating member, on detecting, by means of the operation amount sensor, that the brake operating member is operated;

a second calculation portion for calculating a change rate of the target wheel cylinder pressure;

a third calculation portion for:
  calculating, based on the calculated target wheel cylinder pressure, a first duty factor of currents for supplying to the first motor and the second motor, the first duty factor being required in order to achieve a first rotational speed of the first and second motors at which the first to fourth linear valves stably adjust pressures to the first front wheel cylinder, the second front wheel cylinder, the first rear wheel cylinder, and the second rear wheel cylinder;
  calculating a second duty factor of currents for supplying to the first motor and the second motor, wherein the second duty factor is a duty factor required to achieve the calculated change rate of the target wheel cylinder pressure; and
  selecting the larger one of the first duty factor and the second duty factor as a for-use duty factor to be used in outputting the currents to the first motor and the second motor; and an adjustment portion for adjusting, based on the selected for-use duty factor, the current value for supplying the first motor and the second motor.

2. The vehicle brake control device according to claim 1, wherein the third calculation portion calculates a torque of the first and second motors corresponding to the calculated target wheel cylinder pressure and determines the first duty factor corresponding to the calculated torque and the first rotational speed, based on a characteristic relation among a duty factor, a torque of a given motor, and a rotational speed of the given motor.

3. The vehicle brake control device according to claim 1, wherein:

the first calculation portion calculates the target wheel cylinder pressure at every calculation time instant coming at a calculation interval; and the third calculation portion:
  calculates a pump output rate being a value obtained by dividing the difference between a first brake fluid amount and a second brake fluid amount by the calculation interval, the first brake fluid amount being required in order to generate a first value of the target wheel cylinder pressure calculated at the latest calculation time instant, the second brake fluid amount being required in order to generate a second value of the target wheel cylinder pressure calculated at the second latest calculation time instant;
  calculates, based on an amount of the brake fluid outputted per a 360-degree rotation by the first to fourth pumps, a second rotational speed of the first and the second motors required to achieve the change rate of the target wheel cylinder pressure;
  calculates a torque of the first and second motors corresponding to the calculated first value of the target wheel cylinder pressure; and
  determines the second duty factor corresponding to the calculated torque and the second rotational speed, based on a characteristic relation among a duty factor, a torque of a given motor, and a rotational speed of the given motor.

4. The vehicle brake control device according to claim 2, wherein:

the first calculation portion calculates the target wheel cylinder pressure at every calculation time instant coming at a calculation interval; and the third calculation portion:
  calculates a pump output rate being a value obtained by dividing the difference between a first brake fluid amount and a second brake fluid amount by the calculation interval, the first brake fluid amount being required in order to generate a first value of the target wheel cylinder pressure calculated at the latest calculation time instant, the second brake fluid amount being required in order to generate a second value of the target wheel cylinder pressure calculated at the second latest calculation time instant;
  calculates, based on an amount of the brake fluid outputted per a 360-degree rotation by the first to fourth pumps, a second rotational speed of the first and the second motors required to achieve the change rate of the target wheel cylinder pressure;
  calculates a torque of the first and second motors corresponding to the calculated first value of the target wheel cylinder pressure; and
  determines the second duty factor corresponding to the calculated torque and the second rotational speed, based on a characteristic relation among a duty factor, a torque of a given motor, and a rotational speed of the given motor.

5. A vehicle brake control device, comprising:

a brake operating member to be operated by a driver;

an operation amount sensor for detecting an operation amount of the brake operating member;

first and second front wheel cylinders, which are respectively installed to two front wheels;

first and second rear wheel cylinders, which are respectively installed to two rear wheels;

a reservoir for storing brake fluid;

a main conduit for connecting the first and second front wheel cylinders and the first and second rear wheel cylinders with the reservoir, the main conduit branching into four sections which are respectively connected with the first and second front wheel cylinders and the first and second rear wheel cylinders;

a first pump located in a first one of the four sections, the first pump for pressurizing a first one of the first front wheel cylinder, the second front wheel cylinder, the first rear wheel cylinder, and the second rear wheel cylinder by drawing in and discharging the brake fluid stored in the reservoir;

a second pump located in a second one of the four sections, the second pump for pressurizing a second one of the first front wheel cylinder, the second front wheel cylinder, the first rear wheel cylinder, and the second rear wheel cylinder by drawing in and discharging the brake fluid stored in the reservoir;

a third pump located in a third one of the four sections, the third pump for pressurizing a third one of the first front wheel cylinder, the second front wheel cylinder, the first rear wheel cylinder, and the second rear wheel cylinder by drawing in and discharging the brake fluid stored in the reservoir;

a fourth pump located in a fourth one of the four sections, the fourth pump for pressurizing a fourth one of the first front wheel cylinder, the second front wheel cylinder, the first rear wheel cylinder, and the second rear wheel cylinder by drawing in and discharging the brake fluid stored in the reservoir;

a first motor for driving the first and second pumps which are provided to a first conduit path of the main conduit and pressurize the first conduit path;

a second motor for driving the third and fourth pumps which are provided to a second conduit path of the main conduit and pressurize the second conduit path;

first to fourth adjustment conduits, which are located respectively in parallel with the first to fourth pumps and return the brake fluid to the reservoir;

first to fourth linear valves, which are respectively located in the first to fourth adjustment conduits; and a control means for controlling, based on a detection signal from the operation amount sensor, the first to fourth linear valves, the first motor, and the second motor so as to change a current value for supplying to the first motor and the second motor according to a target wheel cylinder pressure which corresponds to the detected operation amount of the brake operating member, wherein the control means includes:

a first calculation portion for calculating the target wheel cylinder pressure according to the detected operation amount of the brake operating member, on detecting, by means of the operation amount sensor, that the brake operating member is operated;

a second calculation portion for calculating a change rate of the target wheel cylinder pressure;

a third calculation portion for:

calculating, based on the calculated target wheel cylinder pressure, a first duty factor of currents for supplying to the first motor and the second motor, the first duty factor being required in order to achieve a first rotational speed of the first and second motors at which the first to fourth linear valves stably adjust pressures to the first front wheel cylinder, the second front wheel cylinder, the first rear wheel cylinder, and the second rear wheel cylinder;

calculating a second duty factor of currents for supplying to the first motor and the second motor, wherein the second duty factor is a duty factor required to achieve the calculated change rate of the target wheel cylinder pressure; and selecting the larger one of the first duty factor and the second duty factor as a for-use duty factor to be used in outputting the currents to the first motor and the second motor; and an adjustment portion for adjusting, based on the selected for-use duty factor, the current value for supplying the first motor and the second motor.

* * * * *